UNITED STATES PATENT OFFICE.

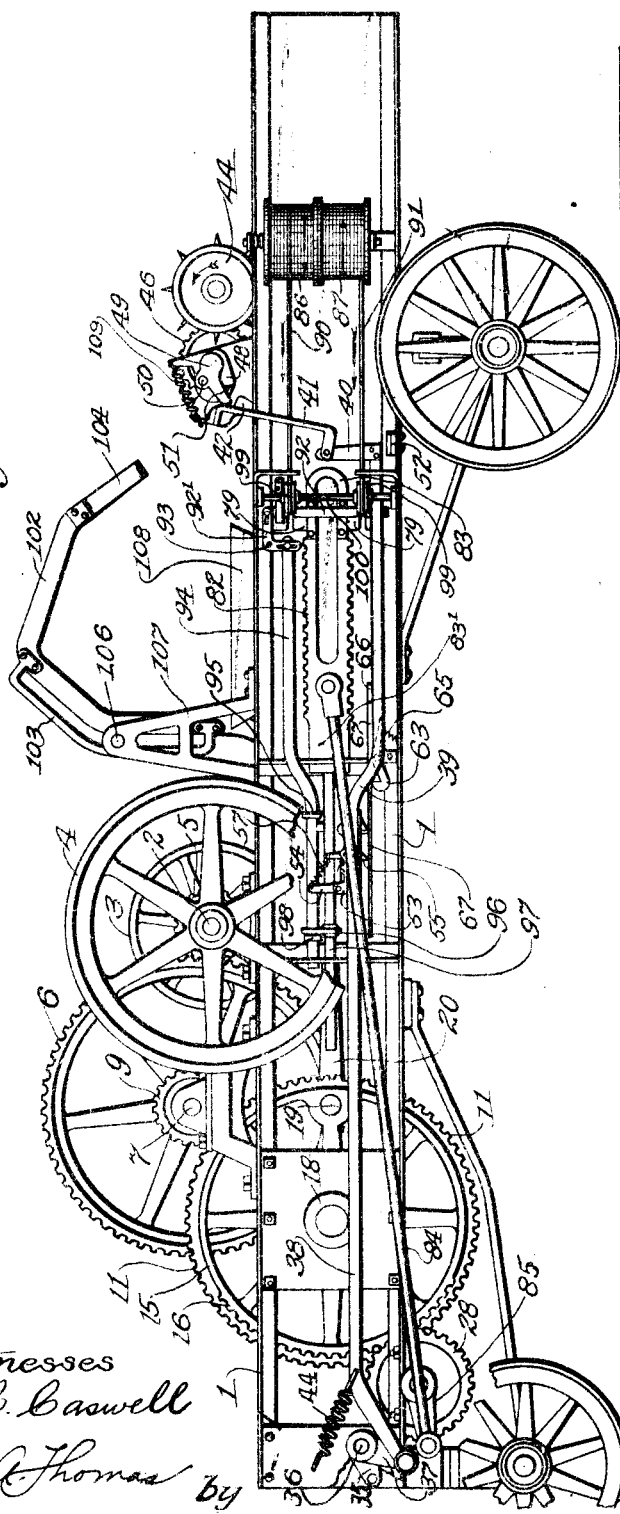

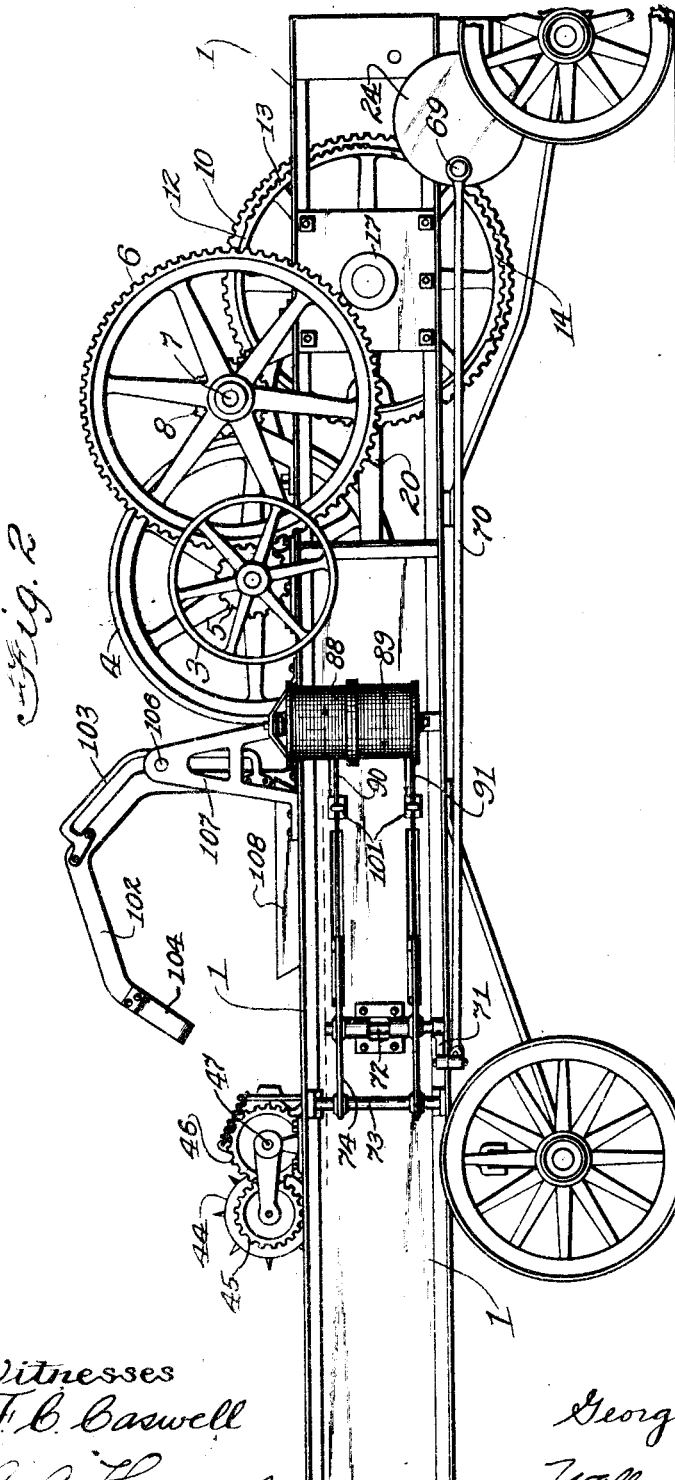

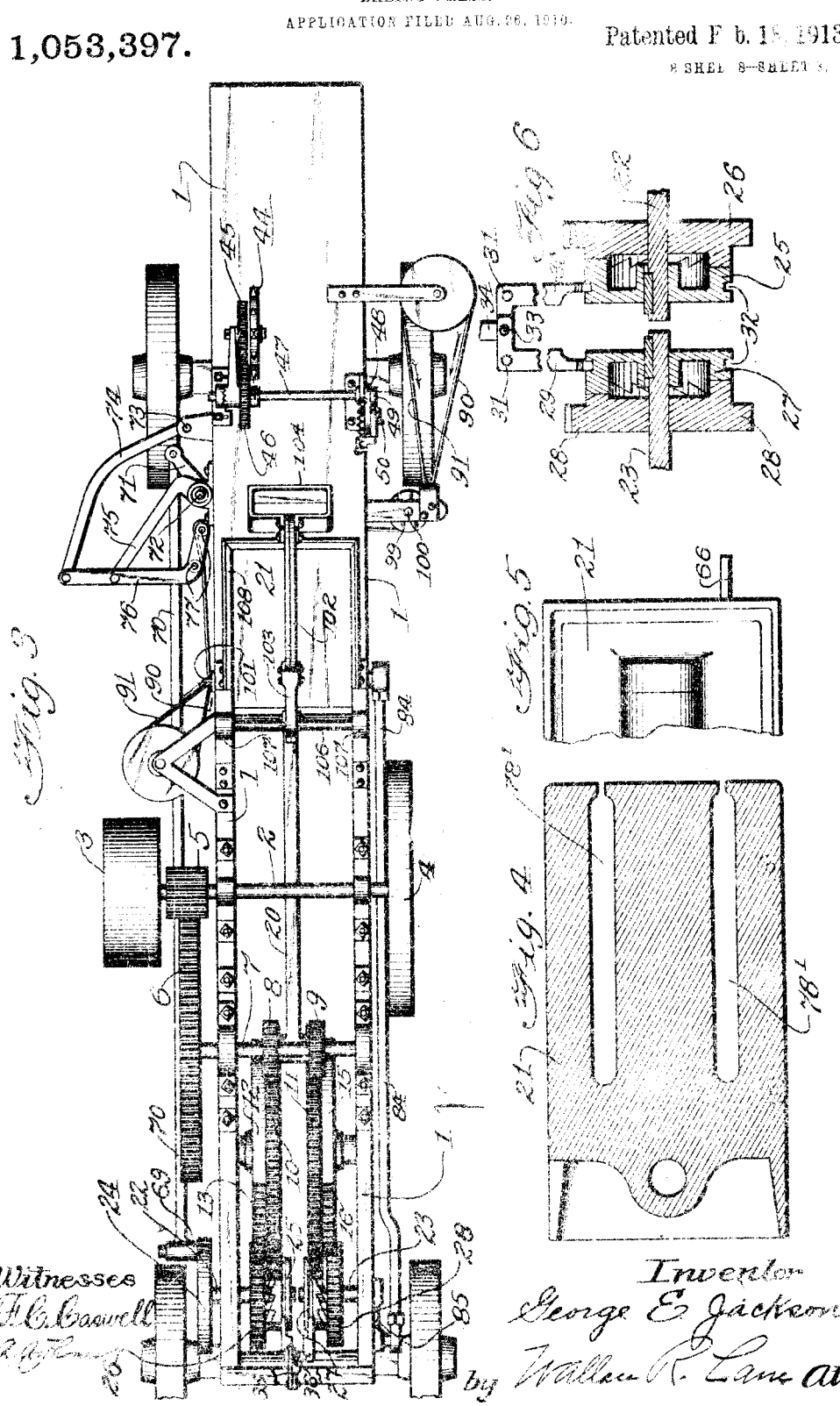

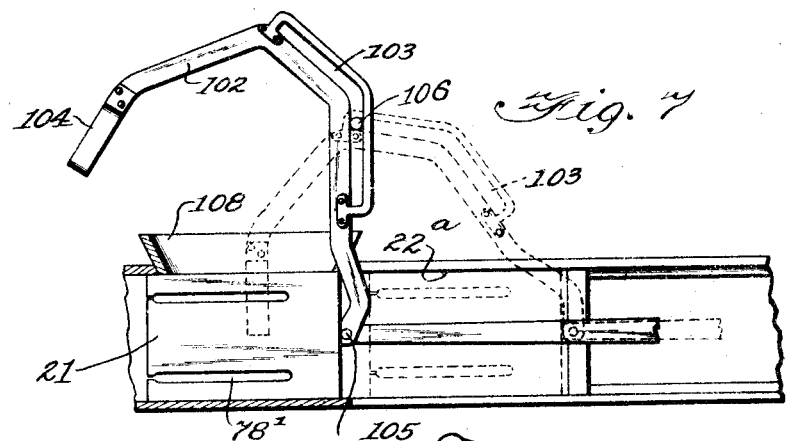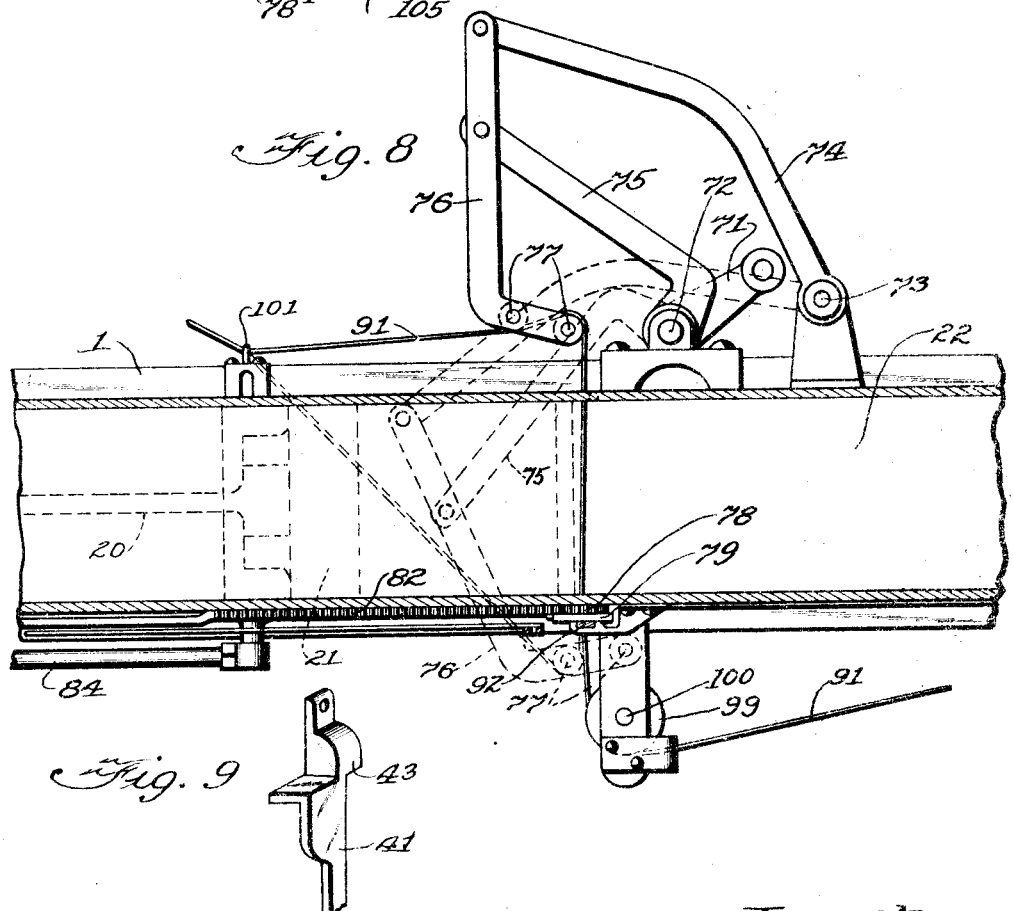

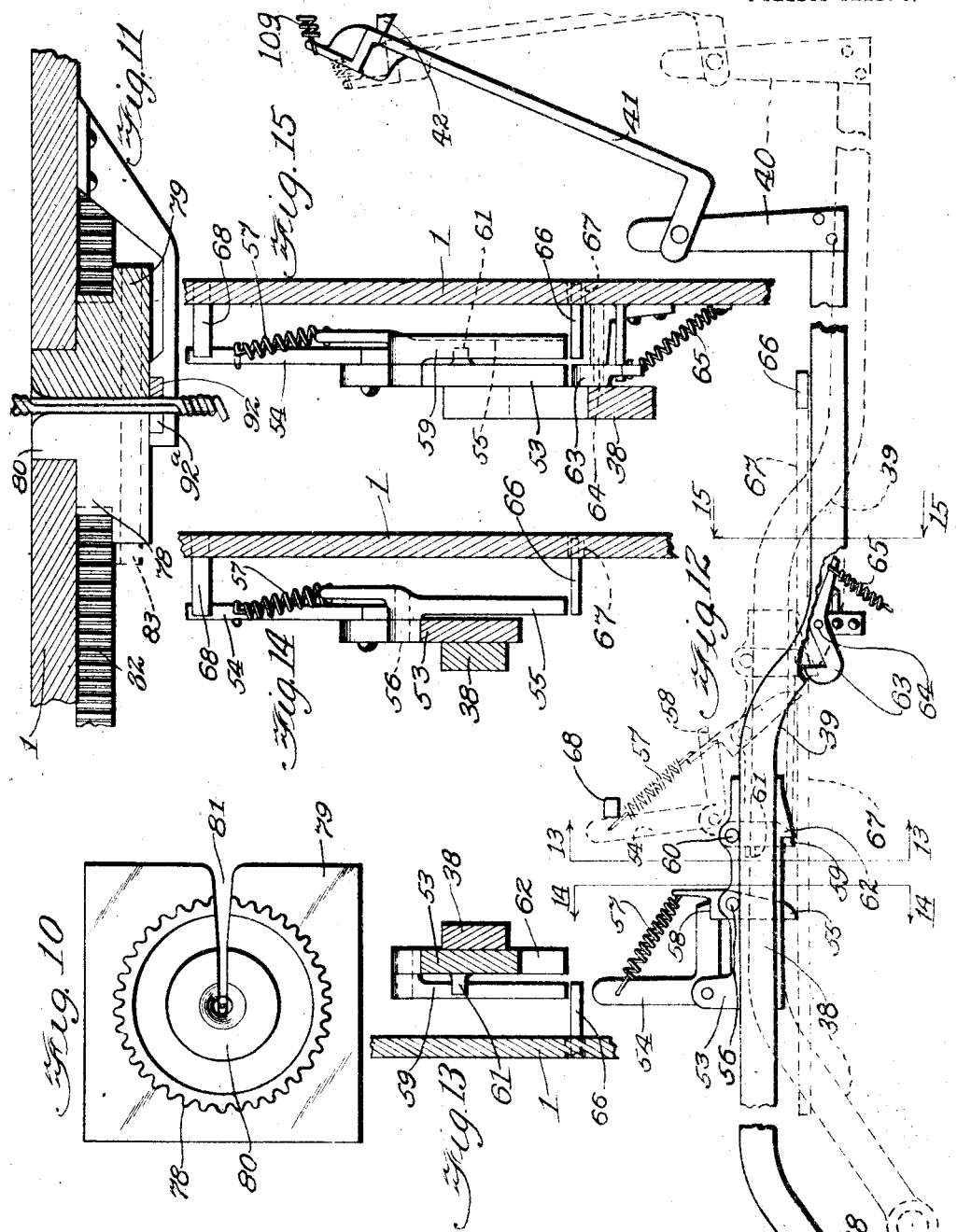

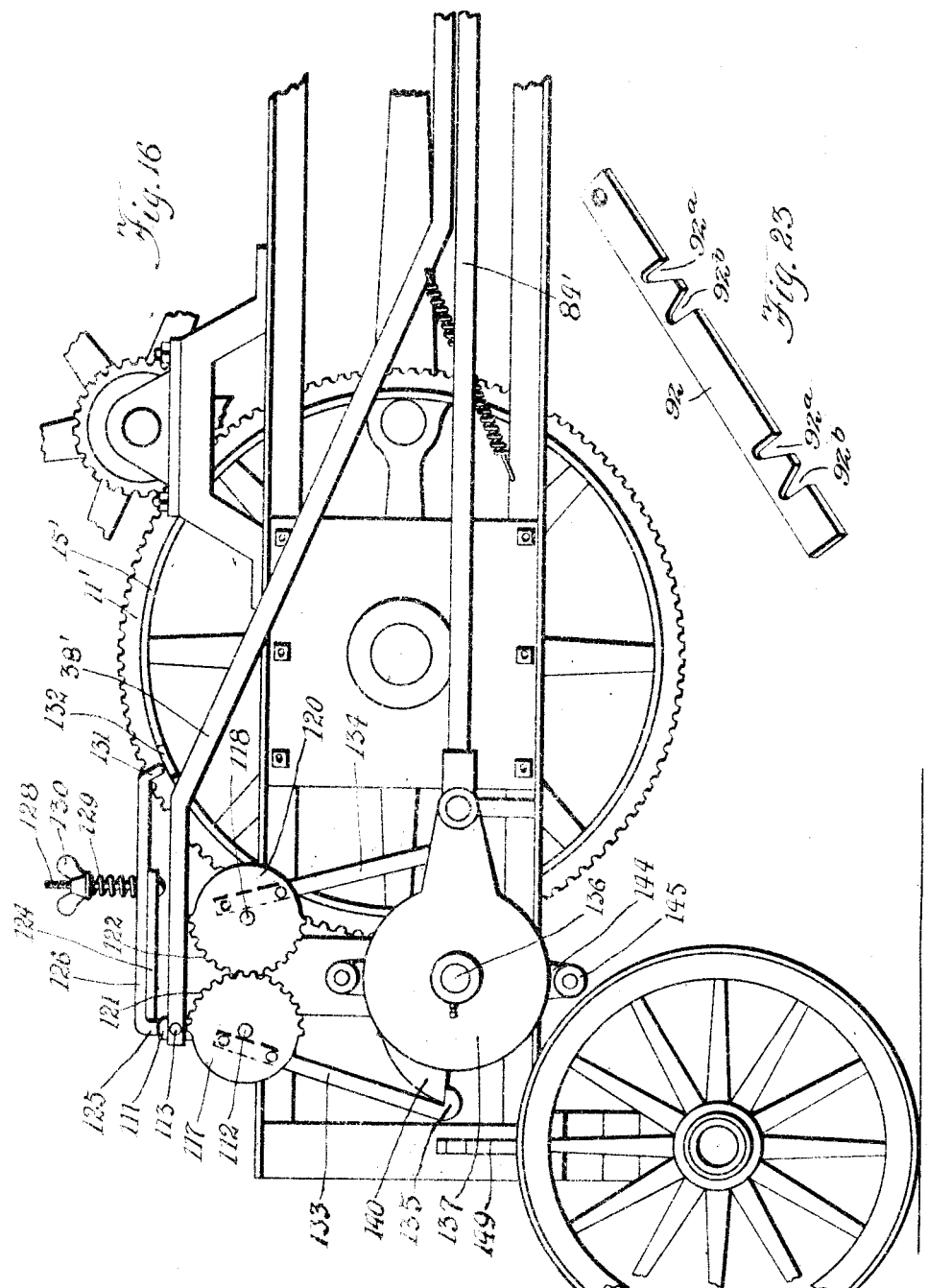

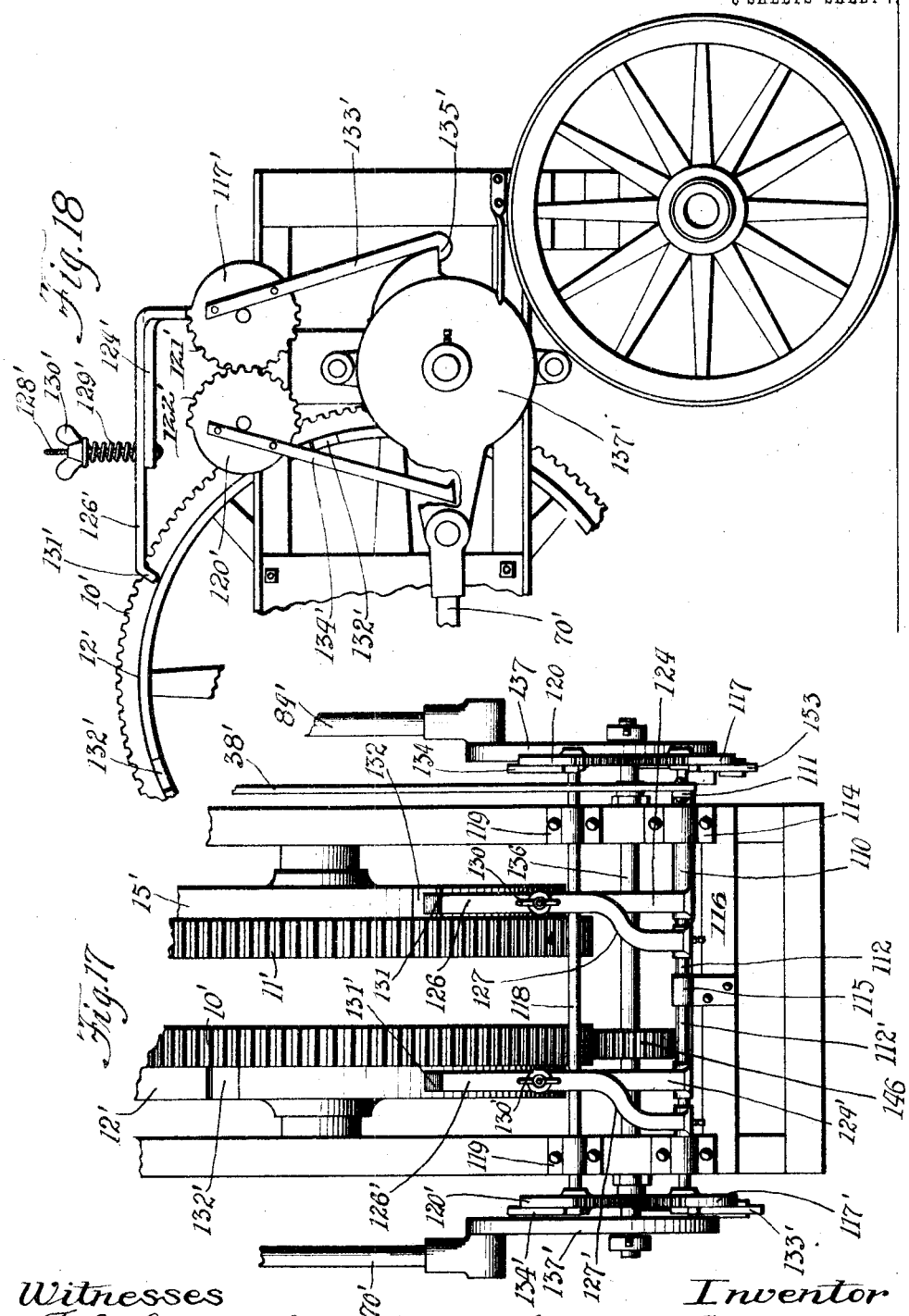

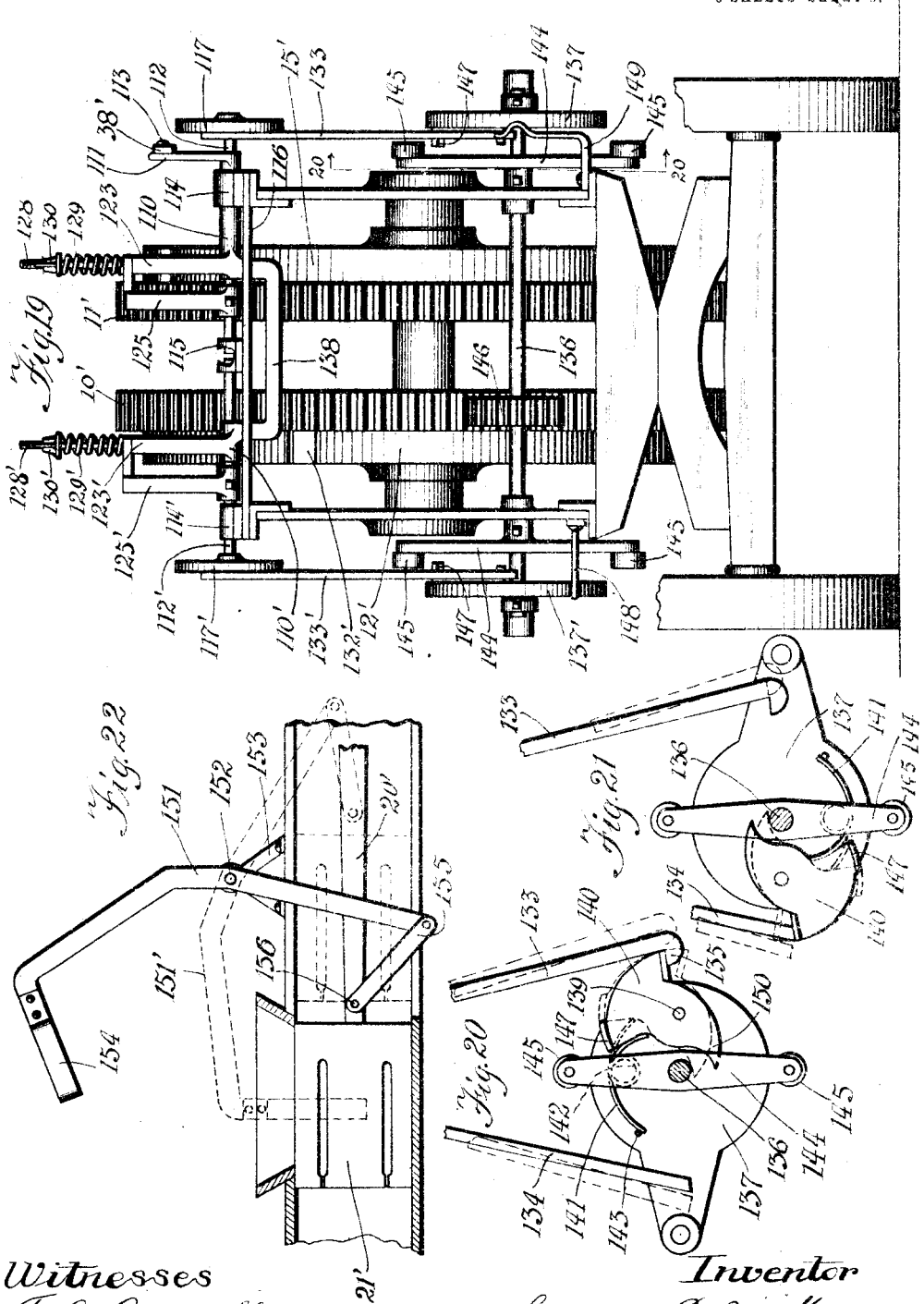

GEORGE E. JACKSON, OF NEWTON, IOWA.

BALING-PRESS.

1,053,397.　　　　Specification of Letters Patent.　　Patented Feb. 18, 1913.

Application filed August 26, 1910. Serial No. 579,121.

*To all whom it may concern:*

Be it known that I, GEORGE E. JACKSON, a citizen of the United States, residing at Newton, county of Jasper, and State of Iowa, have invented a new and useful Improvement in Baling-Presses, of which the following is a specification.

My invention relates to improvements in baling presses, and has for its object a baling press in which the various operations are entirely automatic, and which shall consist of a smaller number of moving parts than baling presses heretofore constructed.

More specifically considered, one object of my invention comprises a new form of wire-twisting mechanism, including disks which are provided with locking portions for engaging coöperating locking surfaces on a reciprocable actuating member. In the preferred form of my invention this actuating member is in the form of a common rack-bar provided with upper and lower teeth which mesh with the teeth on the twisting disks. The operation of the twisting mechanism is alternately reversed for successive bales. This simplifies the operation of the machine in that it obviates the necessity of returning the twisting mechanism to normal position after each operation.

A further object of my invention comprises a new form of wire-feeding mechanism which feeds the wire horizontally across the baling chamber through slots in the plunger. Both the wire-feeding mechanism and the wire-twisting mechanism operate while the plunger is at the end of its compression stroke.

Another object of my invention consists in the provision of a pair of drums for each baling wire, the drums for each wire being arranged on opposite sides of the machine. According to this arrangement the baling wires are paid out from both ends as the size of the bale increases during the operation of the machine. The main objects of this arrangement of the wire drums are the following: First, the proper amount of slack is given the wires during the tying operation to prevent breaking; second, the threading of the machine becomes automatic after the first threading because the two ends of the wires leading from each pair of spools are twisted together, leaving the wires across the baling chamber ready for the next bale to be formed; third, there is no waste wire; fourth, there is no necessity for wire-holding devices.

Another object of my invention is to provide a new form of packing device which is simple in construction and effective in operation.

Another object of my invention consists in the provision of a new form of clutch mechanism for connecting the wire-twisting and wire-feeding mechanisms with the main driving shaft.

These and other objects and advantages of my invention will be more apparent as the specification proceeds.

In the drawings: Figure 1 is a side elevation of my improved baling press; Fig. 2 represents a side elevation as viewed from the side opposite to that shown in Fig. 1; Fig. 3 is a plan view of the baling press; Fig. 4 is an enlarged cross-sectional view of the plunger; Fig. 5 is a fragmental end view of the plunger; Fig. 6 is a cross-sectional detail view showing the clutches which throw the wire-feeding and wire-twisting mechanisms into operation; Fig. 7 is a detail view showing the packing lever and its manner of operation by the plunger; Fig. 8 is a detail view in plan of the wire-feeding arms; Fig. 9 is a fragmental detail view of the top portion of the trip arm, which is automatically lowered when the bale under formation has reached a predetermined size; Fig. 10 is a side elevation of one of the wire-twisting disks; Fig. 11 is a cross-sectional view in plan of a wire-twister, the operating rack being shown in plan; Fig. 12 is a detail view showing the mechanism which is automatically lowered into the path of the traveling plunger for throwing the clutch members shown in Fig. 6 into operation, when the bale has reached a predetermined size: Fig. 13 is a cross-sectional view taken on line 13—13 of Fig. 12; Fig. 14 is a view taken on line 14—14 of Fig. 12; Fig. 15 is a view taken on line 15—15 of Fig. 12; Fig. 16 is a fragmental side elevational view, showing my new form of clutch mechanism, that side of the mechanism being shown which connects with the twisting mechanism; Fig. 17 is a plan view of the mechanism shown in Fig. 16; Fig. 18 is a fragmentary side elevation of that portion of my new form of clutch mechanism which is connected with the wire-feeding mechanism; Fig. 19 is a front view of Fig. 16 and 18; Fig. 20 is a fragmentary detailed view, taken on line 20—20 of Fig. 19, showing one of the clutch members detached, the dotted lines indicating the position of the parts when the clutch member is about to be operatively connected with the main power shaft. Fig. 21 is a view similar to Fig. 20, the parts being shown in the position which they assume after one-half a revolution of the clutch member; Fig. 22 is a fragmentary side view showing a modified form of packing device, and Fig. 23 is a perspective view of the wire-cutting knife.

Referring now in detail to the drawings, the supporting frame-work of the baling press is, as a whole, indicated by the reference numeral 1, and is shown as mounted on wheels. The main power shaft 2, which is mounted transversely of the frame-work, is at one end provided with a power pulley 3, and at the other end with a fly-wheel or balance wheel 4. The pulley 3 is adapted to be connected with any suitable source of power, as, for instance, a gas engine. The pinion 5 on the shaft 2, meshes with the large gear 6 which is fixed upon the counter-shaft 7. This shaft 7 also carries the pinions 8 and 9 which are permanently in mesh with the large gear wheels 10 and 11 respectively. The peripheral surface 12 of the gear 10 is provided with two intermittent sets of teeth 13 and 14, as shown in Fig. 2. The peripheral surface 15 of the gear 11 is provided with a set of teeth 16. For the sake of clearness and brevity the sets of teeth 13, 14 and 16 will hereinafter be referred to as the toothed segments 13, 14 and 16. By comparing the angular position of the toothed segments 13 and 14 on the gear 10 with the angular position of the toothed segment 16 on the gear 11, as shown in Figs. 2 and 1, respectively, it will be seen that the toothed segment 16 extends over an arc which lies between the segments 13 and 14. The gears 10 and 11 are rotatably mounted in bearings 17 and 18, respectively. These gears are connected together by a cross-pin 19 on which is pivoted one end of the plunger rod 20. The other end of this rod is connected to the plunger 21. By means of this connection between the plunger and the gears 10 and 11, the plunger will be reciprocated back and forth in the baling chamber 21ª when the gears are rotated.

Toward the rear of the frame-work are mounted the short shafts 22 and 23. The outer end of the shaft 22 carries the cam disk 24 which, as will hereinafter be explained, operates the wire-feeding mechanism. The inner end of the shaft 22 has rigidly fixed thereto the clutch member 25. The gear 26 is rotatably mounted on the shaft 22, and is provided with clutching teeth which are adapted to engage the oppositely arranged teeth on the clutch member 25. The shaft 23, which may properly be called the twister shaft, has fixed at its inner end the clutch member 27, which is adapted to engage the clutching teeth of the gear 28 rotatably mounted on the shaft 23. The detail view shown in Fig. 6 clearly illustrates how the clutch members 25 and 27 coöperate with the associated clutch gears 26 and 28, respectively. The clutch gears 26 and 28, although rotatably mounted on their respective shafts, are prevented from sliding longitudinally on said shafts. However, the clutch members 25 and 27 are fixed to the shaft so as to rotate therewith and are capable of sliding longitudinally thereon, so as to be moved into and out of engagement with the clutch gears 26 and 28. For moving the clutch members I have shown a pair of bell-crank levers 29 and 30 pivoted to the frame-work at 31, and at their outer ends engaging the clutch members 25 and 27. The outer ends of these levers are preferably yoke-shaped and rest in grooves 32 in the clutch members. The bell-crank levers 29 and 30 are pivotally connected at the common point 33 to the link 34. At the other end the link 34 is connected to the lever 35 which is fixedly mounted upon the shaft 36, as shown at the left in Fig. 1. Upon the shaft 36 is also rigidly mounted the lever 37. It will therefore be seen that if the lever 37 be rotated toward the right, as viewed in Fig. 1, the link 34 will be moved inwardly, (or downwardly as viewed in Fig. 6) and the two clutch members 25 and 27 will be forced away from each other into engagement with the associated gears 26 and 28. This will cause the gears 26 and 28 to be operatively connected with the shafts 22 and 23 and will rotate therewith. Fig. 6 shows the clutch members in their operative position. As shown in Fig. 3, the gear wheel 26 is adapted to mesh with the toothed segments 13 and 14, and the gear 28 is adapted to mesh with the toothed segment 16. The lever 37 is, at its outer end, pivotally connected to the rod 38 which extends toward the front of the press, as shown in Fig. 1. The rod is curved downwardly at 39. To the outer end of this rod is fixed the upward extension 40 to which is pivoted the trip arm 41, as shown in Fig. 1. The upper end of this trip arm is shaped to rest upon the lug 42 carried by the frame-work. The upper end of this trip arm is shown in detail in Fig. 9. The lateral extension 43 on this trip arm is arranged to engage the lug 42. Since the clutch operating rod 38 is free to move downwardly, being pivoted to the lever 37, it will be clear that the trip arm 41 and the operating rod 38 are suspended in their upward position from the rigid lug 42. This suspended position of the parts is shown in Fig. 1. A spring 44, secured at one end to the framework and at the other to the rod 38, as shown at the left of Fig. 1, normally holds the rod in its rearward position, which is the position of the rod as shown in that figure.

I will now describe the mechanism which automatically releases the trip arm 41 from the lug 42, and causes the operating rod to drop.

A spur-wheel 44 is rotatably mounted upon the top of the frame so as to be in the path of movement of the hay which is being pressed in the baling chamber, the direction of movement of this spur-wheel being as indicated by the arrow in Fig. 1. Movement of the spur-wheel is transmitted through gears 45 and 46 (see Fig. 3) to the shaft 47. The cam 48 is fixed upon the shaft 47. The form of this cam is best shown in Fig. 1. A weighted lever 49 is pivoted on the cam at 50. As the spur-wheel 44 is actuated by the movement of the material through the baling chamber, the cam will be rotated in a clockwise direction until the lug 51 on said cam strikes the lever 49 and carries the same along with it, until the lever strikes the upper end of the trip arm 41 forcing it toward the left, (as viewed in Fig. 1) and disengaging it from the supporting lug 42. This causes the trip arm 41 and the operating rod 38 to drop until the outer end of the rod encounters the lug 52 which is fixed to the side of the frame-work, as shown in Fig. 1. Let us now turn our attention to Fig. 12 in which the operating rod is shown in full lines in its rearward suspended position, and in dotted lines in its forward lower position. A plate 53 is carried by the rod 38 just to the rear of the bend 39. A bell-rank lever 54 is pivoted at the elbow to the rear of the plate 53. A dog 55 is pivoted to the plate at 56 and is normally held in a vertical position by the spring 57 connected at one end to the bell-crank lever 54 and at the other end to the extension on the dog 55. This spring forces the bell-crank lever and the dog into engagement with each other at the point 58, as clearly indicated in Fig. 12. A second dog 59 is pivoted to the plate 53 at 60 and is free to swing forwardly; that is, toward the right, as viewed in Fig. 12. A lug 61 carried by the plate 53, prevents the dog 59 from swinging rearwardly. The plate 53 has a downwardly extending lug 62. A pawl 63 is pivoted at 64 to the frame-work of the press and is normally forced upwardly at its free end by the spring 65. As seen in Fig. 5, the plunger 21 is provided at one side with a transverse lug 66. This lug is indicated in full lines in Fig. 12, the plunger being altogether omitted, so as to not obscure the figure. The lug 66 is accommodated in the slot 67 in the side of the frame-work. This slot is indicated in dotted lines in Fig. 12, no part of the framework being shown for the sake of simplicity. From the view shown in Fig. 12, it will be seen that when the operating rod 38 is in its normal or elevated position, the lower ends of the dogs 55 and 59, and the projection 62, will be out of the path of movement of the lug 66. Now let it be assumed that the trip arm has been forced from its supporting lug and that the operating rod 38 is therefore in its lower position. This position of the rod is its rearward lower position. I make this distinction because, as we shall presently see, there is a forward lower position which the rod will assume. If, when the operating rod 38 is dropped to its rearward lower position, the next movement of the plunger is the return or rearward stroke, the lug 66 will strike the projection 62 and the dog 59 and will slightly raise the forward end of the rod. The extent of this movement, however, is insufficient to raise the trip arm 41 into engagement with its supporting lug 42, and as soon as the lug 66 has passed the projection 62 and the dog 59, the operating rod will fall back to its lower position. When the lug 66 on the plunger encounters the dog 55, the plunger being on its return stroke, the lug 66 will ride under the yielding rounded end of the dog. Now, when the plunger moves forwardly while the operating rod 38 is in its rearward lower position, the lug 66 will first encounter the dog 55. As this dog does not swing forwardly the operating rod 38 will be carried along by the plunger until the bell-crank lever 54 strikes the stationary lug 68 carried by the frame-work. When this happens the horizontal arm of the bell-crank 54 is tripped up out of engagement with the dog 55 and the latter is swung to the position in which it is indicated in dotted lines in Fig. 12. When this has taken place, the projection 62 on the plate 53 is in engagement with the pawl 63 and the operating rod is thus locked against rearward movement. The plunger, however, is free to continue its compression stroke. When the operating rod 38 has been moved forwardly by the plunger, as above described, it will assume the position shown in dotted lines in Fig. 12. This is the forward lower position of the operating rod. From what I have stated above, it will be clear that when the operating rod 38 is moved forwardly by the plunger, the clutch members 25 and 27 will be moved into operative engagement with the associated gear wheels 26 and 28. As a result of this the shafts 22 and 23 will be rotated by the toothed segments on the gears 10 and 11, as previously described. Since the toothed segment 16 is intermediate of the toothed segments 13 and 14, the shaft 22 will first be rotated, then will the shaft 23 be rotated, and then will the shaft 22 again be rotated. The transmission ratio between the gear 26 and the segments 13 and 14, and between the gear 28 and the segment 16, is such that the segments impart to the gear wheels one-half a revolution during each engagement.

So far we have seen how the plunger automatically throws into operation the shafts 22 and 23, when the bale under formation has reached a predetermined size. The shaft 22 operates the wire-feeding mechanism, as I believe I have already mentioned, and the shaft 23 operates the wire-twisting and cutting mechanism. I will now take up in succession the construction and operation of the wire-feeding mechanism and the wire-twisting mechanism.

The cam disk 24 fixed upon the shaft 22, carries the pin 69, on which is pivoted the connecting rod 70, as shown in Fig. 2. At its other end the connecting rod is pivotally connected with the lever 71 fixed upon the vertical shaft 72. This connection is best shown in Fig. 8, which shows the wire-feeding needles in detail. In the particular embodiment illustrated in the drawings, I have shown two wire-feeding arms or needles, but it is obvious that the number may be varied to suit circumstances. However, for ordinary bales two wires will usually be sufficient. To the vertical shaft 73, journaled in brackets at the side of the frame-work, are fixed the curved levers 74, one for each needle. Since both needles are alike in construction, a description of one will be sufficient for both. Fixed upon the shaft 72 is the angular lever 75. The levers 74 and 75 are at their outer free ends pivoted to the wire-feeding arm 76. The inner end of this arm is bent and carries a pair of rollers 77 between which the wire is adapted to pass. Normally, the wire-feeding arms are in the position shown in full lines in Fig. 8. However, when the connecting rod 70 is moved from its extreme left position, as shown in Fig. 2, to its extreme right position, the levers 75 are actuated toward the frame-work and carry the wire-feeding arms 76 through the slots in the frame-work across the baling chamber. The horizontal slots 78' in the plunger, as shown in Fig. 4, permit this movement of the wire-feeding arms across the baling chamber. Fig. 8 shows in dotted lines the position which the arms 76 and their connected levers assume in wire-feeding position.

The wire-twisting and cutting mechanism is arranged opposite to the wire-feeding mechanism on the other side of the machine. The wire-twisting mechanism and the various connections therefor, are shown in Fig. 1. The wire-twisting disks are shown in detail in Figs. 10 and 11, and reference will first be had to these figures. On the side of the frame-work are journaled two wire-twisters, one for each wire-feeding arm. Each twister comprises a toothed disk portion 78 and a locking portion 79, which is shown in the drawings as rectangular in form. The hub portion 80 of the twister affords means for journaling the same in the frame-work. The twister is provided with a radial slot 81 which is narrowed toward its inner half to the width of one wire, so that the wires cannot pass each other as the twister is rotated, whereby the wires are essentially twisted together at both ends of the twister. The relative position of the twisters on the frame-work is shown in Fig. 1. A double rack-bar 82 is adapted to reciprocate between the twisters and is so arranged that the teeth on the bar engage the teeth on the associated twisters. Normally the twisters are locked. This locking is effected by the engagement between the locking portion 79 and between the guide extensions 83 and 83', carried at both ends of the rack-bar. A portion of the extension 83 is indicated in dotted lines in Fig. 11 underneath the locking portion 79. So long as the guide extensions 83 engage the locking portions 79 of the twisters, as shown in Fig. 1, the twisters cannot be rotated. The teeth on the rack-bar do not come into engagement with the twisters until either extension has moved out of engagement with the locking portions of the twisters. Reciprocation of the rack-bar 82 is produced by the shaft 23 through the connecting rod 84, which at one end is pivoted to the rack-bar and at the other end to the lever 85 fixed upon the shaft 23. These connections are clearly shown in Fig. 1. When, therefore, the shaft 23 is operated by the toothed segment 16, the connecting rod 84 will actuate the rack-bar either forwardly or rearwardly to operate the twisters.

I will now explain how the baling wires are connected with the twisting and feeding mechanisms.

Referring to Fig. 1, two wire drums 86 and 87 are mounted upon a vertical shaft so as to rotate freely thereon, each independently of the other, the upper drum 86 resting on the lower drum 87. This pair of drums is mounted on the same side as the wire-twisting mechanism. Referring to Fig. 2, the wire drums 88 and 89 are mounted on a vertical shaft so as to rotate freely thereon, each independently of the other, the upper drum 88 resting on the lower drum 89. This second pair of drums is mounted on the same side as the wire-feed ing mechanism. The wire passing from the upper drum 88 to the upper drum 86 is indicated by the reference numeral 90. This may be called the upper baling wire. The lower baling wire 91 runs between the lower drums 87 and 89. By referring to Figs. 1 and 2 it will be seen that the upper baling wire is wound reversely from the way in which the lower baling wire is wound. This arrangement is also indicated, and perhaps more clearly, in the plan view shown in Fig. 3.

The operation of the parts during the formation of the bale will be clearly understood from the above description. Each baling wire really consists of two wires tied together at their free ends, while the other ends of the wires remain wound upon their respective drums. Thus, the upper baling wire 90 is paid out simultaneously by both ends from the upper drums 86 and 88 as the bale increases in size. Similarly the lower baling wire 91 is simultaneously paid out from the lower pair of drums 87 and 89. The arrangement of a drum for each end of the wires, though not absolutely essential, is advantageous. In the first place it allows the wires to be paid out at the rear of the machine where the twisting mechanism is located, in order to keep the wires taut during the twisting operation. It is essential in carrying out the art of the invention that the twisting portions of wire held tightly against a wire holder or threaded up against it for this purpose. It is obvious that during the twisting operation it is essential that a certain amount of wire be paid out in order to allow the twisting to take place properly. More important, however, this necessary amount of wire can not well be obtained if the twisting operation is attempted by holders or the like which are used if the wires are rigidly held by a clamp or other fixed means that the wire would break by reason of the twisting. This objection is overcome by having the wires wound up in the drums which are permitted to rotate a little for allowing the necessary amount of wire to be paid out freely as the twisting operation takes place. Another advantage of having the drums which are located in the rear of the place where the twisting mechanism is located. It also adds great value to this arrangement of wire drums in the automatic threading of the machine after the first threading. In the threading the machine the ends of the wires from corresponding drums on opposite sides of the machine are threaded through the twisting arms and twisted together, joining the two pieces into a single threading. After this initial threading the machine does no rethreading as it were. That is to say, after a bale has been formed and the twisting mechanism has severed the twisting wire (as will be more fully explained hereinafter), the wires are left threaded across the baling chamber just the same as they were when tied together in the initial threading. This automatic threading also does away with any waste wire, since the cutting mechanism severs each twisting wire at a point between the two twists. One of these twists is on the wire around the bale, while the other twist holds together the ends of the wires coming from opposite drums. It will be clearly seen from this that there are two twists in each wire for each bale. The purpose of having the upper baling wire wound reversely with respect to the lower baling wire is to cause the upper drums to rotate reversely with respect to the associated lower drums. Since the upper drums rest by gravity on the lower drums, this reverse rotation of the drums causes sufficient friction between the drums to prevent the baling wires from being paid out too freely. This does away with any special mechanism for holding the wires taut.

Before the machine is set in operation the wires are passed through the slots in the plunger and tied together at the ends of the feeding arms 76. There will thus be two wires stretched transversely across the baling chamber. As the material is fed into the chamber and compressed the wires are paid out from the drums, and when the bale has reached its proper size, the wires will extend transversely across the chamber at the end of the bale and longitudinally of the chamber at the sides of the bale. At this point the wire feeding arms 76 will be thrust across the baling chamber, as previously described, and will carry the wires into the slots of the twisters so as to form two closed loops around the bale. When the wires have thus been fed into the twister slots by the arms 76, the toothed segment 16 will come into engagement with the gear 28 and rotate the shaft 25, whereby the twisters are rotated, as previously described, to twist the wires. The result of this twisting operation is indicated in Fig.

It should be remembered that the feeding and twisting operations occur while the plunger is at the end of its compression stroke. In this way the bale is wired more securely than if the operations occurred while the twister was removed from the bale, which would give the latter a chance to expand before the twisting had been completed.

The twister shaft 25 makes but one-half a revolution during each twisting operation. During the first half revolution of the crank disk 24, the wire feeding arms are carried across the baling chamber through the slots in the plunger and over the wire-twisting disks. After this has taken place the gear 28 is engaged by the toothed segment 16 and given one-half a revolution. This rotates the arm 85 (see Fig. 1) from the position shown in Fig. 1 through an angle of 180°, thereby thrusting the rack 82 forwardly to operate the twisting disks and the cutting device. As the operation of the machine continues the rack-bar 82 remains in its forward position, since the toothed segment 16 has moved out of mesh with the gear 28. After the next bale has been formed and the toothed segment 16 comes again into engagement with the gear 28, the latter will be given another half revolution to rotate the arm 85 from the position in which it was previously left to the position shown in Fig. 1. During this movement of the arm 85 the rack-bar 82 is reciprocated from its forward position back to its rearward position, as shown in Fig. 1. During this rearward movement of the rack-bar the wire-twisting disks are operated to twist the baling wires. The cutting device which the rack-bar operates severs the twisting wires at a point between the two twists made on opposite sides of each wire-twisting disk, as best shown in Fig. 11.

In the form shown in the drawings, the cutting device consists of a vertically movable knife 92 which coöperates with the face of the twisters to cut the wires. The knife is at its upper end connected with the bell crank 92' by a slot-and-pin joint, as clearly shown in Fig. 1. The bell crank 92' is pivoted to the frame work at 93 and is at its other end in slotted engagement with the slidable bar 94. This bar carries a lug 95 which is in the path of movement of the lug 96 fixed upon the extension 97 of the rack-bar. From this it will be clear that as the rack-bar approaches the limit of its forward movement the lug 96 strikes the lug 95 and pushes the rod 94 forwardly, whereby the knife 92 is raised to sever the twisted wires. The perspective view of Fig. 23 shows the knife 92 provided with a pair of cutting notches 92ª and a pair of cutting notches 92ᵇ. When the knife is moved upwardly at the end of the forward movement of the rack-bar 82, the notches 92ª sever the twisted wires. When the next successive bale has been formed and the rack-bar 92 is moved rearwardly to operate the twisters, the lug 96 encounters the lug 98 at the rear of the bar 94 and forces the latter rearwardly. This rocks the horizontal arm of the bell crank 92' downwardly and at the same time forces the knife 92 downwardly. During this downward movement of the knife 92, the cutting notches 92ᵇ cut the twisted wires. It will thus be seen that the cutting mechanism operates with equal facility in both directions and is reversed in operation whenever the operation of the twisting mechanism is reversed. It will be apparent that when the rack-bar 82 is in its rearward position, as shown in Fig. 1, the locking extension 83 engages the locking portions of the twister disks to hold the latter against movement and maintain them in proper position to receive the baling wires. When the rack-bar has been actuated to the limit of its forward movement the locking extension 83' comes into engagement with the locking portions of the wire twisting disks.

In order to hold the baling wires in proper position with respect to the twisters, I provide guide pulleys 99 opposite the slots in the twisters, as shown in Fig. 1. These guide pulleys are loosely mounted on the vertical shaft 100. To hold the wires in proper relation to the feeding arms, guide lugs 101 are fixed on the frame-work, as shown in Fig. 2. The return movement of the wire-feeding arms takes place when the toothed segment 14 engages the gear 26. This return movement takes place after the twisting operation has been performed, because of the fact that the gear 26 does not come into engagement with the toothed segment 14 until after the toothed segment 16 has passed out of engagement with its associated gear 28.

I will now describe how the plunger on its return movement, after the feeding and twisting operations have been accomplished, restores the operating rod 38 to its normal or raised position.

It should be remembered that when the plunger begins its return movement after the bale has been completed, the operating rod 38 is in the position indicated in dotted lines in Fig. 12. When the extension 66 on the plunger strikes the dog 59, the operating rod is raised, because the dog is prevented from yielding rearwardly because of the stop 61. When the operating rod is thus raised the projection 62 at the bottom of the plate 53 is lifted out of engagement with the locking pawl 63. The trip bar 41 being in its forward lower position will be raised sufficiently to hook over the lug 42, the spring 109 drawing the upper end of the trip rod over the supporting lug. As soon as the locking engagement between the projection 62 and the pawl 63 is broken, as above described, the spring 44 draws the operating rod rearwardly to its original position. This rearward movement of the operating rod causes the clutch members 25 and 27 to be moved out of engagement with the gear wheels 26 and 28, whereby the feeding and twisting mechanisms are disconnected from the source of power.

There remains yet to be described the packing lever for packing the material into the baling chamber. This mechanism is best shown in Fig. 7. The packing lever 102 is angular in shape and is provided with the angular slot 103. The head 104 is shaped to pack the material into the baling chamber. The lower end of the lever is pivoted to the connecting rod of the plunger at 105. The fixed shaft 106 which passes through the angular slot 103 is mounted upon the standards 107 on top of the framework. When the plunger is in its forward position, as indicated in Fig. 7, the packing lever is in its elevated position. However, as the plunger returns, the lever is moved downwardly into the baling chamber to pack the material coming through the hopper 108. The packing position of the lever is indicated in dotted lines in Fig. 7.

In Fig. 22, I have shown a modified form of packing mechanism. The curved lever 151 is pivoted on the shaft 152 which is journaled in a pair of brackets 153, mounted on the sides of the machine, one of these brackets only being shown in the figure. The outer end of this lever is provided with the packing head 154. To the lower end of this lever is pivoted one end of the link 155, the other end of this link being pivoted to the plunger rod 20' at the point 156. When the plunger 21' is in its compressing position, the packing lever is in its substantially upright position, as indicated in full lines in Fig. 22. During the return movement of the plunger the lever assumes the position indicated in dotted lines at 151 in Fig. 22 and the material fed into the baling chamber is packed down by the head 154.

I will now take up in detail the description of the construction and operation of my new form of clutch mechanism, as shown in Figs. 16 to 21, inclusive. It will of course be understood that in these figures the purpose is to show only the clutch mechanism and so many of the associated parts as are necessary for an understanding of the operation of the clutch mechanism, no attempt being made to repeat in these figures what has been shown in the preceding descriptions, which have above been described in detail. Where Figs. 16 to 21 include those parts which correspond with similar parts shown in the preceding figures above described, these parts will be indicated by the same reference characters as the corresponding parts in the previous figures, except that the reference numerals will be primed. In Fig. 16 the rod 38' is at one end (not shown) adapted to be connected with the top arm 41 shown in Figs. 1 to 15, inclusive. The other or front end of the rod 38' is pivotally connected with the sleeve 110 through crank arm 111, as best shown in Fig. 19. The sleeve 110 is rotatably mounted on the shaft 112. The rod 38' is pivotally connected to the arm 111 at 113, the said arm being rigidly attached to the sleeve 110. The sleeve 110 is mounted in the bearing 114, which is carried by the framework of the machine. The inner end of the shaft 112 finds support in the bearing 115, which is centrally carried by the cross-bar 116 at the front end of the machine, as shown in Figs. 17 and 19. At the outer end of the shaft 112 is rigidly mounted the segmental gear disk 117. On one end of the transverse shaft 118, which is rotatably supported in bearings 119, is fixed the segmental gear disk 120. The teeth 121 of the disk 117 are permanently in mesh with the teeth 122 of the disk 120, as shown in Fig. 16. Rigidly mounted upon the sleeve 110 is the upright arm 123, as shown in Fig. 19. This arm has a horizontal portion or extension 124, as shown in Figs. 16 and 17. Securely fixed upon the shaft 112 is the upright arm 125, as best shown in Fig. 19, this arm being provided with a horizontal extension 126, as shown in Figs. 16 and 17. The extensions 124 and 126 are in alinement at their free ends, as shown in Fig. 17, the extension 126 being for this purpose curved toward the extension 124 at the point 127. The screw-bolt 128 passes upwardly through the free end of the extension 124 and through the extension 126, as shown in Fig. 16, the head of the bolt resting against the under side of the extension 124. A compression spring 129 is coiled about the bolt 128, the lower end of the spring resting against the horizontal extension of the arm 125 and the upper end of the spring resting against the thumb-nut 130 which is adjustable upon the bolt 128. The free horizontal end of the arm 125 is provided with a downwardly extending finger 131, as shown in Fig. 16. By reference to Fig. 17 it will be seen that the free end of the arm 125 is in vertical alinement with the track 15' of the large gear 11'. It will be clear that the gear 11' corresponds with the gear 11 shown in Fig. 3, and that the gear 11' is adapted to be connected with the main power shaft 2, as previously described in detail in connection with Fig. 3. The track 15' is provided with a notch or opening 132, into which the finger 131 is adapted to extend when the arm 125 is rocked downwardly, as will presently be described. The gear disk 117 has fixed thereto the arm 133, while the gear disk 120 has secured thereto the arm 134. As seen in Fig. 16 these arms extend downwardly in a diverging direction. The arm 133 is provided with an inwardly hooked portion 135 for a purpose to be presently described. The arm 134 is not provided with any hook portion, as shown in Fig. 20. The transverse shaft 136, suitably supported in the framework of the machine, as shown in Fig. 19 has rigidly secured to the ends thereof the crank disks 137 and 137'. The crank disk 137 is connected with the rod 84' for operating the wire-twisting mechanism.

The connection between the rod 84' and the wire-twisting mechanism is the same as the connection between the rod 84 and the wire-twisting mechanism as shown in Fig. 1, and further description of such connection will, therefore, be unnecessary.

Before describing the operation of the disks 137 and 137', I will first describe the connections between the gear wheel 10' and the crank disks 137'. These connections are substantially identical with the connections between the gear wheel 11' and the crank disk 137, described above, but for the sake of clearness will here be briefly referred to by indicating numerals. The shaft 112' is in alinement with the shaft 112 and is near its outer end mounted in the bearing 114' carried on the upper side of the frame-work of the machine. The inner end of the shaft 112' is mounted in the centrally located bearing 115, which bearing, it will be remembered, also supports the inner end of the shaft 112. The termination of the two shafts 112 and 112' in the bearing 115 is shown in Fig. 19. Rotatably mounted upon the shaft 112' is the short sleeve 110'. From this sleeve rises an L-shaped arm having a vertical section 123' and a horizontal section 124', as indicated in Figs. 18 and 19. For the sake of brevity, I will hereinafter refer to this L-shaped arm as the arm 123', this arm being similar to the arm 123 previously described. The sleeves 110 and 110' are rigidly connected together by the cross-piece 138, as indicated in Fig. 19. Rigidly mounted on the shaft 112' opposite the arm 123', is the L-shaped arm 125', which is similar to the arm 125 and has a horizontal extension 126', as indicated in Fig. 18. In order that the horizontal extension 126' may be in vertical alinement with the track 12' of the gear wheel 10', it is curved toward the arm 123' at 127', as best shown in Fig. 17. A bolt 128' passes through the free end of the arm 124', the head of the bolt engaging the under side of that arm, and also through the horizontal extension 126', as indicated in Fig. 18. A compression spring 129' surrounding the bolt 128' bears at one end against the horizontal extension 126' and at the other end against the thumb-nut 130'. As a result of this arrangement when the L-shaped arm 123' is tilted downwardly, the spring 129' will force the horizontal extension 126' downwardly so that the finger 131' at the end of that extension will engage in one of the openings or recesses 132' provided in the track 12' of the gear wheel 10'. The outer end of the shaft 112' has fixed thereto the interrupted gear disk 117'. A disk 120' is mounted on one end of the shaft 118 so that the teeth 121' of the disk 117' are permanently in mesh with the teeth 122' of the disk 120', as indicated in Fig. 18. The gear disk 117' has secured thereto the arm 133', while the disk 120' has secured thereto the arm 134'. The arrangement of these arms is substantially identical with the arms 133 and 134, as shown in Fig. 16, and as previously described. The arms 133' and 134' diverge downwardly. The lower end of the arm 133' is provided with a hook portion 135' having a horizontal engaging surface, the purpose of which is to be presently described. The arm 134' has no such hook portion, but has a horizontal engaging surface at the end thereof. The crank disk 137' previously referred to, is associated with the arms 133' and 134'.

Since the clutch mechanisms which are associated with the crank disks 137 and 137' are identical, it will only be necessary to describe how one pair of arms—say the arms 133 and 134—controls the associated clutch mechanism for operatively connecting the crank disk with the driving shaft 136. In this connection reference will be had to Figs. 20 and 21 which best show the details of the clutch mechanism controlled by the arms 133 and 134; it being understood that the description of these two figures applies fully to the clutch mechanism associated with the crank disk 137'. The crank disk 137 has pivoted thereto at 139, the connecting member 140. The normal position of this member is that indicated in full lines in Fig. 20. Also the normal position of the arms 133 and 134 is that indicated in full lines. When the arms are in their normal position the connecting member 140 rests on the hook portion 135 of the arm 133. A spring 141 is coiled about the stud 142 carried on the interior face of the crank disk 137. One end of this spring bears against the lug 143, while the free end bears against the connecting member 140 so as to force the same outwardly. The arm 144 is fixed upon the shaft 136 at some distance from the crank disk 137, as indicated in Fig. 19. The outer ends of this arm are provided with rollers 145. Since the shaft 136 rotates continuously, being connected with a source of power through the large gear 10' and the pinion 146, the arm 144 is continuously rotated. The connecting member 140 is provided with a lateral extension 147 which is normally out of the path of movement of the rollers 145, as may be seen from Fig. 20. That is to say, although the extension 147 projects beyond a plane passing through the rollers 145, as may be seen from Fig. 19, nevertheless the rollers clear this extension when the connecting member 140 is in its normal position. Now when the rod 38' is actuated rearwardly (in a manner similar to the operation of the rod 38 previously described in detail), and the finger 131 is caused to engage in the recess 132 of the track 15 (as previously described), the gear disks 117 and 120 will be given a movement to separate the rods 133 and 134 into the position indicated in dotted lines in Fig. 20. When this takes place the connecting member 140 is released from engagement with the rod 123 and the spring 141 forces the connecting member outwardly into position indicated by dotted lines in Fig. 20. When the connecting member is in this position, the distance of the lateral extension 147 from the axis of rotation of the arm 114 is increased and the extension is now in the path of movement of the rollers 145. Consequently, as the arm 114 continues to rotate in a clockwise direction, as viewed in Fig. 20, the upper roller will engage the lateral extension 147, whereby a rigid operative connection is established between the driving shaft 136 and the crank disk 147. Before the crank disk has completed one-half a revolution the arms 133 and 134 are moved together again in their full line position. When, therefore, the crank disk has completed one half a revolution, as indicated in Fig. 21, the connecting member 140 encounters the lower end of the rod 124, and is forced inwardly into the position shown in full lines in Fig. 21, thereby removing the extension 147 out of the path of operation of the rollers 145. This inward position of the connecting member 140 may be said to be its inoperative position. From the above description it will be apparent that as long as the rods 133 and 134 are in their inward position the clutch mechanism is inoperative—by which I mean that it is not effective in coupling the crank disk 137 with the driving shaft 136. When, however, the rods 133 and 134 are moved outwardly and release the connecting member 140, the clutch mechanism automatically operates to connect the crank disk with the driving shaft and thereby operate either the wire-twisting mechanism or the wire-feeding mechanism. The rods 133 and 134 are quickly moved to their original positions when the finger 131 at the free end of the arm 125, disengages the opening or recess 132. By reference to Figs. 7 and 8 it will be seen that the recess 132 in the track 13' is substantially midway between the recesses 132' on the track 12'.

From what has been said above, it will be apparent that the recess 132 controls the connection of the crank disk 137 with the driving shaft 136 and that the recesses 132' control the connection of the crank disk 137' with the driving shaft. The object of arranging the recesses in staggered relation to each other is to first cause the crank wheel 137' to turn one half a revolution to actuate the wire-feeding mechanism into feeding position, then to cause the crank disk 137 to operate the wire-twisting and cutting mechanism, and then to cause the crank disk 137' to make another half revolution to withdraw the wire-feeding mechanism from the baling chamber. These alternate operations of the wire-feeding and wire-twisting mechanisms have already been described in detail and a further description is therefore deemed unnecessary.

To hold the crank disks against accidental movement when not in operation, I provide suitable frictional means, such as springs 148 and 149, which engage the disks 137' and 137, respectively, as best shown in Fig. 19. The outward movement of the connecting member 140 is limited by providing the member with a tail piece 150 which engages the shaft 136 when the member is thrown outwardly into operative position.

Various changes may be made in my new form of clutch mechanism without departing from the essence of the invention.

Certain features illustrated and described in this case are not here claimed broadly because they are described and claimed in my co-pending application Ser. No. 456,377, filed October 6, 1908.

While I have described one specific embodiment of my invention, it is apparent that changes and modifications may be made by those skilled in the art, without departing from the scope of the invention as defined in the appended claims.

Having thus described my invention, what I claim as new, and desire to secure by Letters Patent of the United States is:

1. In a baling press, the combination of a frame-work having a baling chamber, a plunger reciprocable in said baling chamber and provided with horizontal slots, wire-feeding members, mechanism for actuating said members horizontally across the baling chamber through said slots, vertically rotatable wire-twisting disks, a horizontally reciprocable rack-bar operating between said disks for actuating the same, and connections whereby the wire-feeding members and the wire-twisting disks are operated while the plunger is at the end of its compression stroke.

2. In a baling press, the combination of a pair of wire twisting disks provided each with a locking portion, a reciprocable rack-bar for actuating said disks, and means carried by said rack-bar for normally engaging the locking portions of the disks.

3. In a baling press, a wire-twisting member having a toothed disk portion and a flat locking portion, said disk portion being provided with a radial slot.

4. In a baling press, the combination of a pair of vertically rotatable wire-twisting disks provided with teeth, and a common rack-bar adapted to be reciprocated between said disks, the upper and lower edges of said rack-bar being provided with teeth which mesh with the teeth on the disks.

5. In a baling press, the combination of a wire-feeding arm provided at its outer end with a pair of rollers between which the wire passes, a curved lever pivoted at one end to a fixed support and at its other end to the inner end of said arm, a second curved lever pivoted at one end to said arm at an intermediate point between the ends of said arm, and actuating means connected with the other end of said second lever for pivotally actuating the same to operate the wire-feeding arm.

6. In a baling press, the combination of a wire-feeding arm having a main body portion which extends normally at substantially right angles to the baling chamber and terminates at its inner end in a laterally curved portion provided with wire-holding means, a pair of levers pivoted at one end to the frame-work of the press and at the other end to the main body portion of said wire-feeding arm, and a reciprocable shaft connected with one of said levers for operating said arm.

7. In a baling press, the combination of a wire-feeding arm substantially L-shaped in form, wire-holding means carried by the shorter portion of said arm, a pair of pivoted levers connected with the longer portion of said arm, and actuating means connected with one of said levers.

8. In a baling press, the combination of a packing mechanism comprising a rigid angular lever provided with an angular slot intermediate between its ends, said slot having a vertical portion and an inclined portion, a fixed shaft passing through said slot, and a reciprocable plunger with which the lower end of said lever is connected, whereby the free end of said lever is elevated during the compression stroke of the plunger, and is pressed into the material during the return stroke of the plunger.

9. In a baling press, the combination of a frame-work having a baling chamber, a plunger reciprocable in said baling chamber and provided with horizontal slots, wire-feeding members, mechanism for actuating said members horizontally across the baling chamber through said slots, vertically rotatable wire-twisting disks, and a horizontally reciprocable rack-bar engaging said disks for actuating the same, said reciprocating bar carrying holding means for said disks.

10. In a baling press, the combination of a frame-work having a baling chamber, a plunger reciprocable in said baling chamber and provided with horizontal slots, wire-feeding members, mechanism for actuating said members horizontally across the baling chamber through said slots, vertically rotatable wire-twisting disks, a horizontally reciprocable rack-bar engaging said disks for actuating the same, said reciprocable rack bar carrying holding means for said disks, and a cutting device automatically actuated by said rack-bar after the twisting operation.

11. In a baling press, the combination of a pair of wire twisting disks provided each with a locking portion, and a member arranged to operate between said disks for actuating the same, said member having locking portions which coöperate with the locking portions on said disks for locking the latter against movement.

12. In a baling press, the combination of a pair of wire twisting disks provided each with a locking portion, and a reciprocable rack-bar for actuating said disks, said rack-bar being at either end provided with locking portions which normally engage the locking portions of the disks.

13. In a baling press, the combination of a pair of wire twisters having each a toothed portion and a locking portion, and an actuating member having toothed portions which engage the toothed portions on said twisters for operating the same, said actuating member being provided with a locking portion at each end of the toothed portions to normally engage the locking portions of the disks.

14. In a baling press, the combination of a pair of rotatable wire twisters having each a toothed disk portion and a flat locking portion, and a reciprocable rack-bar, having upper and lower rows of teeth which mesh with the teeth on the twisters, said rack-bar being at each end of the rows of teeth provided with flat locking portions which normally coöperate with the locking portions on said twisters to lock the same against movement.

15. In a baling press, the combination with a wire twister having a toothed disk portion and a locking portion, of an actuating member having teeth adapted to engage said toothed portion and also having a locking portion for normally coöperating with the locking portion of the twister to lock the same against movement.

16. In a baling press, the combination of a wire feeding-arm substantially L-shaped in form, a pair of rollers carried by the shorter portion of said arm for receiving the baling wire between them, a pair of pivoted levers connected with the longer portion of said arm, and actuating means connected with one of said levers.

17. In a baling press, the combination of a wire-feeding arm comprising a body portion and a lateral end portion, a pair of rollers journaled in said end portion and arranged to receive the baling wire between them, one of said rollers forming a guide for the wire in passing from said rollers into the baling chamber when the arm is in its inoperative position, the other roller forming a guide for the wire when the arm is in its operative or feeding position, and means for moving said arm across the baling chamber of the press into feeding position.

connecting member pivoted to said crank disk, a spring tending to rock said connecting member outwardly, a pair of levers having stop surfaces at diametrically opposite points with respect to said crank disk, said connecting member being arranged to engage one or the other of said stop surfaces to be thereby held inwardly against the action of said spring, a lateral lug on said connecting member, said lug being out of the path of movement of the projections on said arm when the connecting member is in its normal or inward position, and mechanism for moving the lower ends of said levers outwardly to release said connecting member and bring the lug thereon into the path of movement of the lateral projections on said arm, whereby said arm and said connecting member are locked together to connect the crank disk operatively with the power shaft.

24. In a baling press having wire-twisting mechanism, wire-feeding mechanism and a reciprocable plunger, the combination of a rotatable power shaft, an arm fixed at its lower end on said shaft, lateral projections on the ends of said arm, a crank disk loosely mounted upon said shaft, a rod pivoted to said crank disk and adapted to operate the wire-feeding or wire-twisting mechanism, a connecting member pivoted to said crank disk, a spring tending to rock said connecting member outwardly, a pair of levers having stop surfaces at diametrically opposite points with respect to said crank disk, said connecting member being arranged to engage one or the other of said stop surfaces to be thereby held inwardly against the action of said spring, a lateral lug on said connecting member, said lug being out of the path of movement of the projections on said arm when the connecting member is in its normal or inward position, and mechanism controlled by the plunger for moving the lower ends of said levers outwardly to release said connecting member and bring the lug thereon into the path of movement of the lateral projections on said arm, whereby said arm and said connecting member are locked together to connect the crank disk operatively with the power shaft.

25. In a baling press having wire-twisting mechanism, wire-feeding mechanism and a reciprocable plunger, the combination of a rotatable power shaft, an arm fixed at its lower end upon said shaft, lateral projections on the ends of said arm, a crank disk loosely mounted upon said shaft, a rod pivoted to said crank disk and adapted to operate the wire-feeding or wire-twisting mechanism, a connecting member pivoted to said crank disk, a spring tending to rock said connecting member outwardly, a pair of levers having stop surfaces at diametrically opposite points with respect to said crank disk, said connecting member being arranged to engage one or the other of said stop surfaces to be thereby held inwardly against the action of said spring, a lateral lug on said connecting member, said lug being out of the path of movement of the projections on said arm when the connecting member is in its normal or inward position, a pair of toothed disks on which the upper ends of said levers are mounted said disks being permanently geared together, a rock-shaft on which one of said disks is fixed and means controlled by the plunger for rocking said shaft to separate the lower ends of said lever and release said connecting member, so that the lug is brought into the path of movement of the lateral projections on said arm, whereby said arm and said connecting member are locked together to connect the crank disk operatively with the power shaft.

26. In a baling press having wire-twisting mechanism, wire-feeding mechanism and a reciprocable plunger, the combination of a rotatable power shaft, a member fixed upon said shaft, a crank disk loosely mounted upon said shaft, a rod pivoted to said crank disk and adapted to operate the wire-feeding or wire-twisting mechanism, normally inoperative connections between said member and said crank disk, and mechanism controlled by the plunger for rendering said connections operative to cause rotation of the crank disk from the power shaft.

27. In a baling press, a wire-twisting member having a toothed operating portion and locking portion.

28. In a baling press, a plurality of rotatable wire-twisting members, and means for alternately operating said members in reverse directions to twist the wires in alternately opposite directions.

29. In a baling press, a plurality of rotatable wire-twisting members, means for alternately operating said members in reverse directions to twist the wires in alternately opposite directions, and cutting mechanism operated in alternately reverse directions for cutting the twisted wire at each operation.

30. In a baling press, a wire-cutting knife provided with two pairs of cutting notches.

31. In a baling press, the combination of a vertically reciprocable wire-cutting knife provided with two pairs of cutting notches, and means for operating said knife in alternately reverse directions to cut the twisted wires, one pair of notches cutting the wire when the knife is operated downwardly, and the other pair of notches cutting the wire when the knife is operated upwardly.

32. In a baling press having wire twisting mechanism, and a reciprocal plunger, a rod operatively connected for working said wire twisting mechanism, a crank disk connected to drive said rod, normally inoperative connections between said crank disk and a driving shaft, said connections including a gear wheel having a projecting flange cut away at predetermined points, and an arm pressing on said flange and operative by its movement to establish driving connections to said crank and its wire twisting rod.

33. In a baling press, the combination of a main drive shaft, driving connections from said shaft to a pair of large gear wheels, a plunger having its driving rod pinned between said gear wheels, each of said gear wheels having a side flange forming a cam surface, said flange being cut away at appropriate points, arms bearing on each of said cam surfaces, and wire twisting mechanism and wire feeding mechanism, and means operative through said cam bearing arms to establish driving connections in succession between the main power shaft of the machine and the feeding and twisting mechanisms.

1019 Marquette Bldg., Chicago, Ill., July 5th, 1910.

GEORGE E. JACKSON.

Witnesses:
 ANDREW RASMUSSEN,
 SILAS RASMUSSON.